United States Patent
Kim

(10) Patent No.: US 6,354,422 B1
(45) Date of Patent: Mar. 12, 2002

(54) PARKING APPARATUS OF AN AUTOMATIC TRANSMISSION AND METHOD FOR CONTROLLING THE SAME

(75) Inventor: Chang-Sup Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/652,129

(22) Filed: Aug. 31, 2000

(30) Foreign Application Priority Data

Nov. 29, 1999 (KR) .............................................. 99-53444

(51) Int. Cl.[7] .............................................. B60K 41/26
(52) U.S. Cl. ........................ 192/219.5; 188/31; 188/69; 74/439; 74/446
(58) Field of Search .......................... 192/220.2, 219.4, 192/219.5; 188/31, 69; 74/439, 446

(56) References Cited

U.S. PATENT DOCUMENTS 4,157,745 A * 6/1979 Nelson ........................ 188/31
6,279,713 B1 * 8/2001 Young et al. ............ 192/219.5

* cited by examiner

*Primary Examiner*—Charles A. Marmor
*Assistant Examiner*—Saúl Rodriguez

(57) ABSTRACT

A parking apparatus of an automatic transmission is provided to enable movement of the select lever from P range to another range to be realized more smoothly. A parking apparatus of an automatic transmission includes a parking gear assembly comprising an inner rotating member fixed to an output shaft of the transmission and an outer rotating member with indents formed on an outer circumference, the outer rotating member being rotatably disposed the inner rotating member, a parking rod assembly comprising a projection, the projection being interlocked with one of the indents in a parking "P" range, and a device for generating a rotational displacement between the inner rotating member and the outer rotating member when the projection is released from the indent.

5 Claims, 5 Drawing Sheets

PARKING APPARATUS OF AN AUTOMATIC TRANSMISSION AND METHOD FOR CONTROLLING THE SAME

BACKGROUND OF THE INVENTION (a) Field of the Invention

The present invention relates to an automatic transmission, and more particularly, to a parking apparatus of an automatic transmission that enables a parking rod to be easily disengaged from a parking gear, thereby making it easy a select lever to move from P range to another range more smoothly, especially when the car is on a slope. The present invention further relates to a method for controlling such a parking apparatus of an automatic transmission.

(b) Description of the Related Art

Most of the well-known automatic transmissions are provided with, in addition to a general parking brake, a parking apparatus to prevent the car from moving by locking the parking gear in a parking "P" range, the parking gear being fixedly mounted around the output shaft.

When the select lever is shifted to the P range, a parking rod linked to the lever activates a sprag so that an end of the sprag gets inserted into an indent formed on an outer circumference of the parking gear, which accordingly locks the parking gear.

FIG. 5 shows a conventional parking apparatus.

A detent plate 100 is formed to push a parking rod 102 when the select lever (not shown) is shifted to a P range. When the detent plate 100 pushes the parking rod 102, the parking rod 102 lifts a proximal end of a sprag 108 with a roller 104 moving rightward along a roller support 106.

Accordingly, a distal end of the sprag 108 falls with its projection 110 being inserted into an indent 114 formed on an outer circumference of a parking gear 112 so that the parking gear 112 is locked.

A return spring 116 is disposed at a pivot axis of the sprag 108 to bias the distal end of the sprag 108 upward.

In operation, when a car is parked on a slope, the car moves slightly downhill so that the parking gear 112, fixed around an output shaft of the transmission, rotates a small amount equal to a clearance between the projection 110 and a side wall defining the indent 114.

Resultantly, the projection 110 inserted in the indent 114 comes into tight contact with the side wall, forming a high frictional force between the projection 110 and the side wall. The high frictional force causes a problem that easy movement of the select lever from a parking P range to another range is prevented.

SUMMARY OF THE INVENTION

The present invention has been made in an effort to solve the above problem of the prior art.

It is a first object of the present invention to provide a parking apparatus that is designed such that a parking rod can be easily disengaged from a parking gear so that a select lever can shift easily from a P range to another range.

It is a second object of the present invention to provide a method for controlling a parking apparatus which a select lever can shift easily from a P range to another range.

To achieve the above first object, the present invention provides a parking apparatus comprising:

a parking gear assembly comprising an inner rotating member fixed to an output shaft of the transmission and an outer rotating member with indents formed on an outer circumference, the outer rotating member being rotatably disposed around the inner rotating member;

a parking rod assembly comprising a projection, the projection being interlocked with one of the indents in a parking "P" range; and means for generating a rotational displacement between the inner rotating member and the outer rotating member when the projection is released from the indent.

The means for generating rotational displacement of the parking apparatus comprises:

a cylinder to which fluid pressure is supplied through a fluid path connecting the cylinder and an fluid gallery formed along an axis of the output shaft, the cylinder being formed inside of the inner rotating member;

a piston activated by the fluid pressure, the piston being disposed inside of the cylinder;

a key hole, of which the shape is trapezoidal, formed inside of the outer and inner rotating members, a larger diameter of the key hole being formed in the outer rotating member; and a sliding key, of which the shape is also trapezoidal, disposed in the key hole with a restoring spring between larger surfaces of the sliding key and the key hole.

To achieve the second object, the present invention provides a method of controlling a parking apparatus comprising an inner rotating member fixed to an output shaft of a transmission and an outer rotating member with indents formed on an outer circumference, the outer rotating member being hydraulically rotatable at a predetermined displacement with respect to the inner rotating member, the method comprising the steps of:

(a) determining if a select lever is in a P range;

(b) determining if a foot brake is operating when the select lever is in P range;

(c) supplying fluid pressure to rotate the outer rotating member with respect to the inner rotating member at the predetermined displacement when the foot brake is operating;

(d) determining if the select lever is shifted to another range;

(e) discontinuing the fluid pressure supply when the select lever is shift to another range;

(f) determining if the vehicle velocity equals zero;

(g) determining if the select lever is in the P range hen the vehicle speed equals zero;

(h) determining if the foot brake is operating when the select lever is in the P range;

(i) determining if the engine is stopped.

The method further comprises the steps of:

(j) determining, when the select lever is not shifted from the P range to another range in the step (d), if the foot brake is operating; and (k) discontinuing the oil pressure supply and returning to the step (a).

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be hereinafter described with reference to the accompanying drawings.

Figure 1:
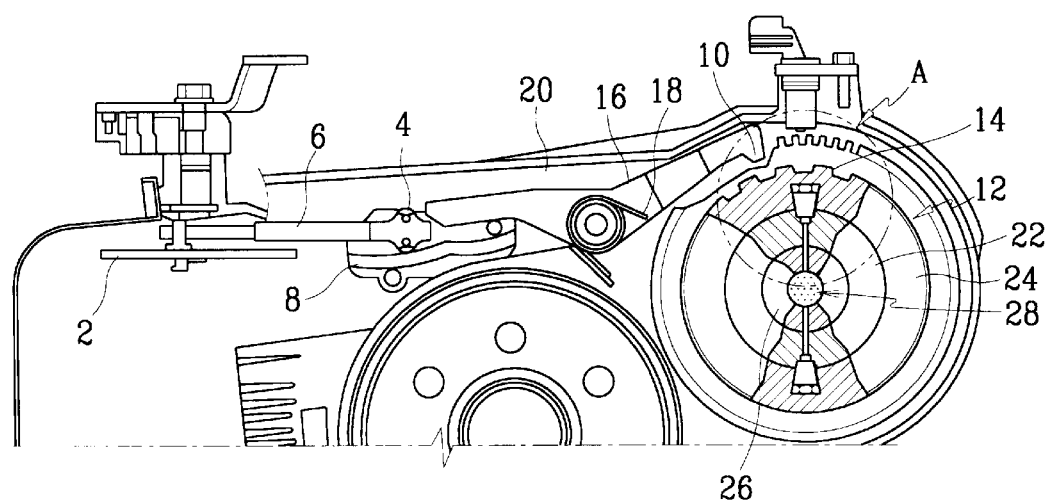
FIG. 1 is a schematic view of a parking apparatus of an automatic transmission according to a preferred embodiment of the present invention.

FIG. 1 shows a parking apparatus of an automatic transmission according to a preferred embodiment of the present invention.

A detent plate 2 is formed to push a parking rod 6 when the select lever (not shown) is shifted to a P range. When the detent plate 2 pushes the parking rod 6, the parking rod 6 lifts a proximal end of a sprag 16 with a roller 4 moving rightward along a roller support 8.

Accordingly, a distal end of the sprag 16 falls with its projection 10 being inserted into one of indents 14 formed on the outer circumference of a parking gear 12 so that the parking gear 12 is locked.

A return spring 18 is disposed at a pivot axis of the sprag 16 to bias the distal end of the sprag 16 upward.

Figure 2:
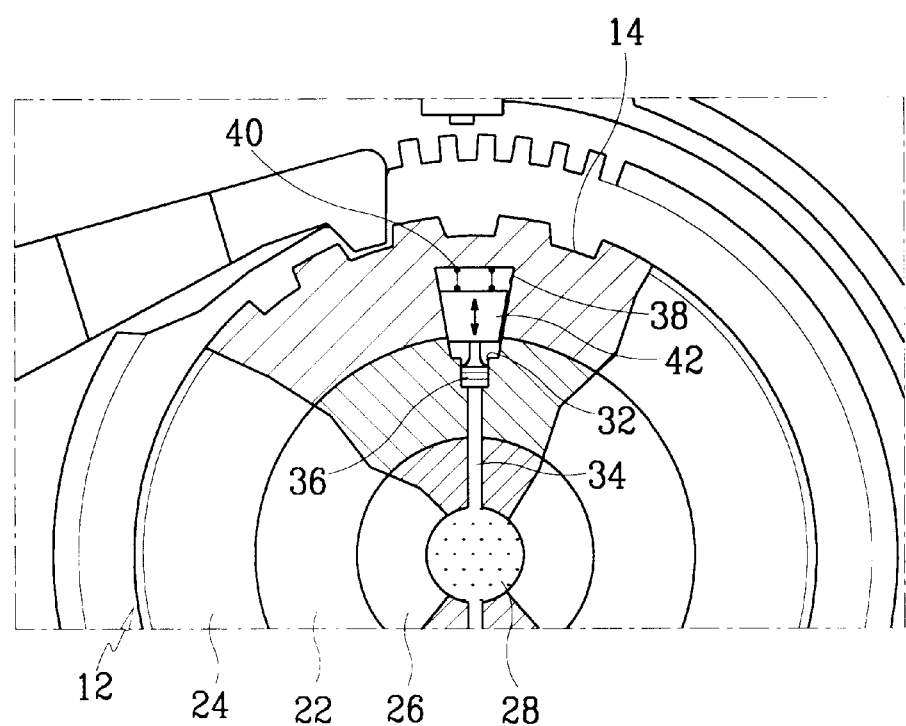
FIG. 2 is a detailed view of a circled portion A in FIG. 1.

Referring to FIG. 2, there is shown a detailed view of the parking gear 12.

A fluid gallery 28 is formed along the axis of an output shaft 26, the fluid gallery being formed to supply fluid pressure from a fluid pressure source (not shown).

The parking gear 12 comprises an inner rotating member 22 fixed on the output shaft 26 and an outer rotating member 24 with the indents 14 formed on its outer circumference, the outer rotating member 24 being mounted on the outer circumference of the inner rotating member 22, and the outer rotating member 24 being rotatable around the inner rotating member 22 by a predetermined displacement. That is, provided is means for generating the displacement of the outer rotating member 24 with respect to the inner rotating member 22 when the foot brake is operated in a state where the select lever is in the P range and the engine starts, while coupling the inner and outer rotating members 22 and 24 to each other The means for generating the displacement will be described more in detail with reference to FIGS. 2 and 3.

A cylinder 32 is formed inside of the inner rotating member 22 and connected to a fluid gallery 28 formed along an axis of the output shaft 26 through a fluid path 34. A piston 36 is disposed in the cylinder 32 such that it can be activated by the hydraulic fluid supplied from a fluid source (not shown) through the fluid gallery 28 and the fluid path 34.

A key hole 38 is formed through the inner and outer rotating members 22 and 24, the key hole 38 being connected to the cylinder 32. The key hole 38 is trapezoidal-shaped, a width of which is increased as it goes away from the axis of the output shaft 26.

Disposed in the key hole 38 is a sliding key 42 which has also a trapezoidal-shape and is biased against the piston 36 by a restoring spring 40 disposed between the larger top of the sliding key 42 and the outer wall of the key hole 38. The height of the sliding key 42 is less than the key hole 38 and of the largest width of the sliding key 42 is less than that of the key hole 38.

Figure 3:
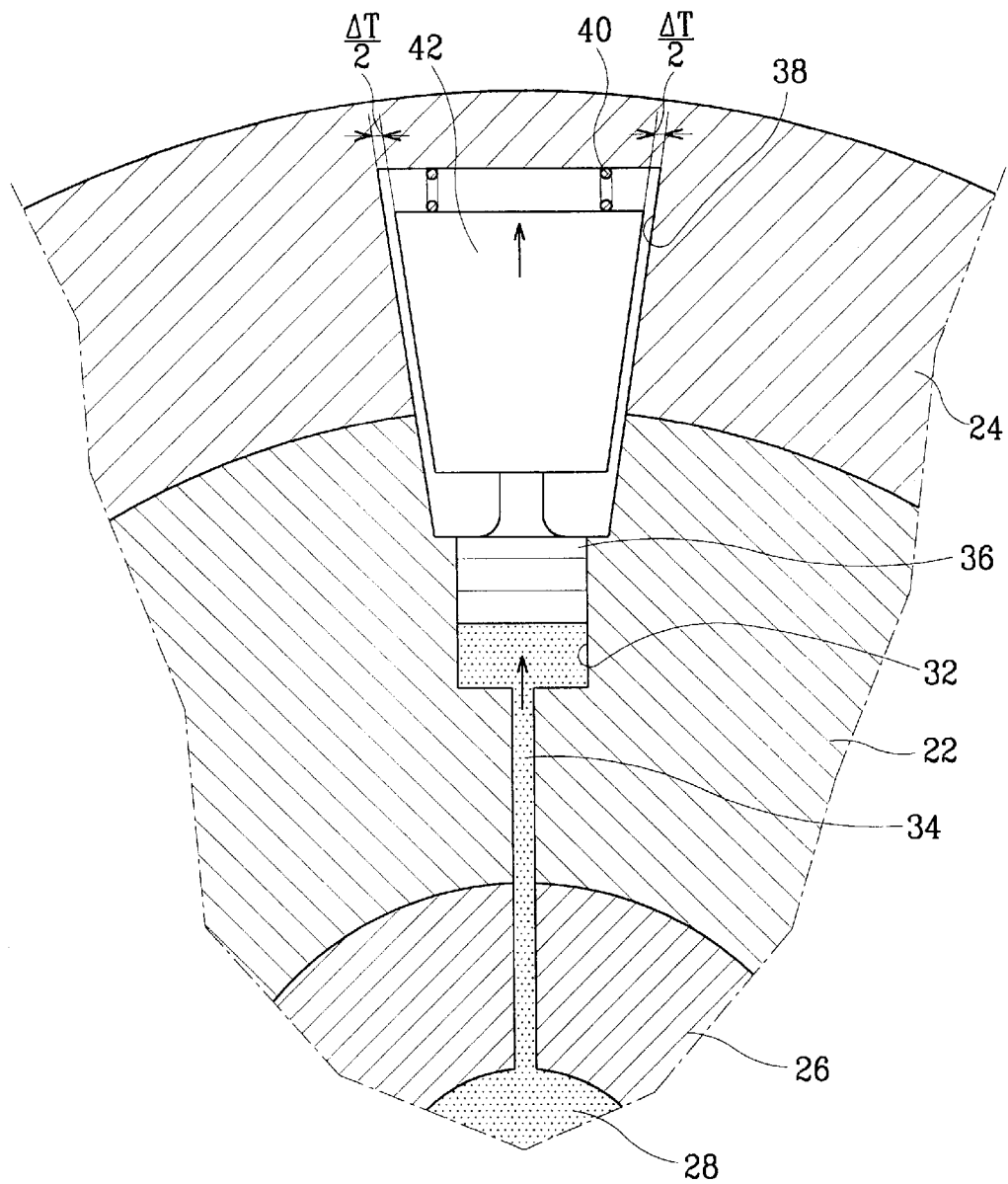
FIG. 3 is an enlarged view of a cylinder area in FIG. 2.

Therefore, when the piston 36 pushes up the sliding key 42 by the force of the fluid pressure from the fluid path 34 as shown in FIG. 3, clearances of $$\left(\frac{\Delta T}{2}\right)'s$$

are defined between outer side walls of the sliding key 42 and inner side walls of the key hole 38 so that the outer rotating member 24 is rotatable by as much as the clearance $$\frac{\Delta T}{2}$$

with respect to the inner rotating member 22.

The clearance $$\frac{\Delta T}{2}$$

formed to either side wall of the sliding key 42 acts as a margin for the projection 10 of the sprag 16 to get easily out of the indent 14 of the outer rotating member 24 when the car is parked on a slope upward or downward.

The clearance $$\frac{\Delta T}{2}$$

is formed only when the foot brake operates. That is, when the foot brake operates, the output shaft 26 is stationary and accordingly the inner rotating member 22 is rotationally fixed so that the outer rotating member 24 is able to rotate by the clearance $$\frac{\Delta T}{2}.$$

On the contrary, when the fluid pressure is supplied to the cylinder 32 without operation of the foot brake when the vehicle is on a slope, the clearance $$\frac{\Delta T}{2}$$

may be lost as the inner rotating member 22, which is connected to the output shaft 26, rotates as the vehicle slightly moves downward.

Accordingly, the outer rotating member 24 comes in contact with the inner rotating member 22 through the sliding key 42 with a high force, so that the projection 10 in the indent 14 may come in tightly contact with the indent wall, forming a high frictional force between the projection 10 and the indent wall. The high frictional force prevents easy movement of the select lever from P range to another range.

To solve this problem, the present invention also provides a controlling method for the parking apparatus of the present invention.

Figure 4:
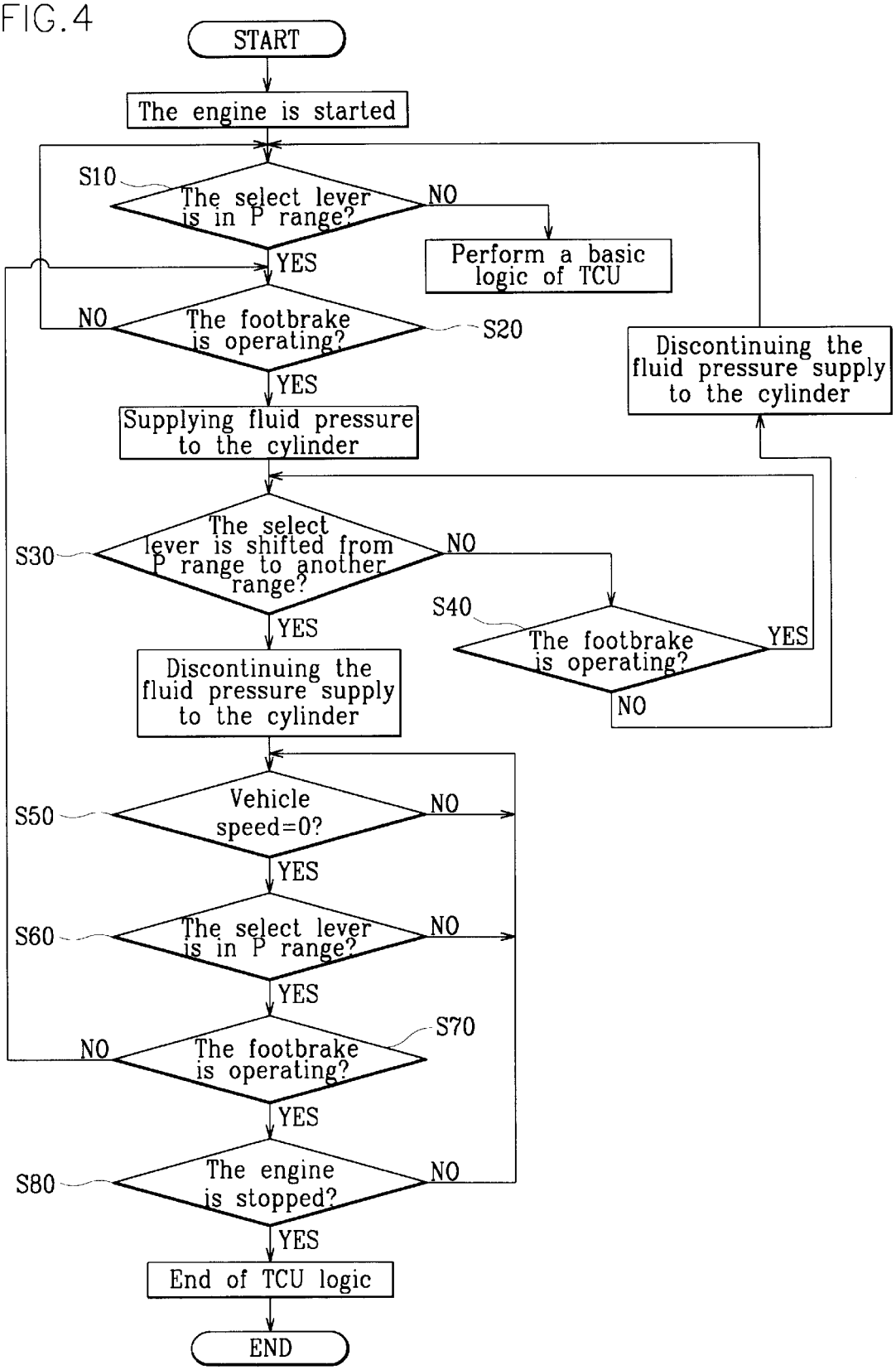
FIG. 4 is a flowchart showing a controlling method of a parking apparatus according to a preferred embodiment of the present invention.
Figure 5:
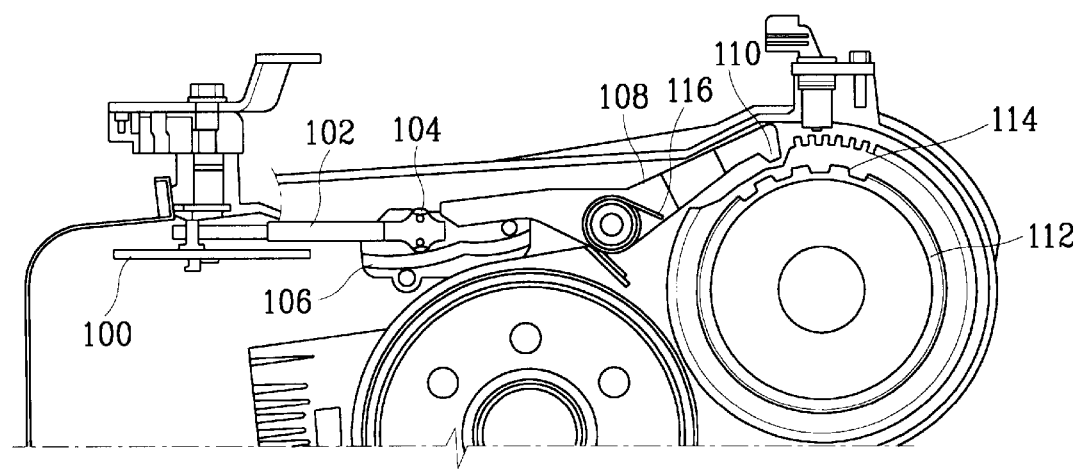
FIG. 5 is a schematic view of a conventional parking apparatus of an automatic transmission.

FIG. 4 shows a flowchart showing a controlling method of a parking apparatus according to a preferred embodiment of the present invention.

When the engine is started, a transmission control unit (TCU) determines whether the select lever is in P range (S10). When the select lever is not in P range, the TCU proceeds to perform its basic logic, and when the select lever is in P range, the TCU determines whether the foot brake is operating (S20). When the foot brake is not operating, the procedure returns to the first step S10, and when the foot brake is operating, fluid pressure is supplied to the cylinder 32.

Then, the TCU determines whether the select lever is shifted from P range to another range (S30).

When it is determined that the select lever is shifted to another range, supplying the fluid pressure to the cylinder 32 is discontinued, then the TCU determines whether the vehicle velocity equals zero (S50). When the vehicle velocity does not equal zero, the fifth step S50 is repeatedly executed, and when the vehicle velocity equals zero, the TCU determines whether the select lever is in P range (S60).

When the select lever is not in P range, the procedure returns to the fifth step S50, and when the select lever is in P range, the TCU determines whether the foot brake is operating (S70).

When the foot brake is not operating, the procedure returns to the step S20, and when the foot brake is operating, the TCU determines whether the engine is stopped (S80).

When the engine is still operating, the procedure returns to the fifth step S50, and when the engine is stopped, the procedure ends.

In addition, when it is determined that the select lever is still in P range in the step S30, the TCU determines whether the foot brake is operating (S40).

When the foot brake is operating, the procedure returns to the step S30, and when the foot brake is not operating, supplying the fluid pressure to the cylinder 32 is discontinued, then the procedure returns to the first step S10.

According to the parking apparatus of an automatic transmission and its controlling method of this invention as shown above, the select lever can be shifted from P range to another range with ease, particularly when the car is parked on a slope, because of a clearance formed between the tooth of the sprag and the indent, the clearance being formed by the clearance producing means.

What is claimed is:

1. A parking apparatus of an automatic transmission, comprising:
    a parking gear assembly comprising an inner rotating member fixed to an output shaft of the transmission and an outer rotating member with indents formed on an outer circumference, the outer rotating member being rotatably disposed around the inner rotating member;
    a parking rod assembly comprising a projection, the projection being interlocked with one of the indents in a parking "P" range; and
    means for generating a rotational displacement between the inner rotating member and the outer rotating member when the projection is released from the indent.

2. An apparatus of claim 1 wherein the means for generating rotational displacement comprises:
    a cylinder to which fluid pressure is supplied through an fluid path connecting the cylinder and an fluid gallery formed along an axis of the output shaft, the cylinder being formed inside of the inner rotating member;
    a piston activated by the fluid pressure, the piston being disposed inside of the cylinder;
    a key hole, of which the shape is trapezoidal, formed inside of the outer and inner rotating members, a larger diameter of the key hole being formed in the outer rotating member; and
    a sliding key, of which the shape is also trapezoidal, disposed in the key hole with a restoring spring between larger surfaces of the sliding key and the key hole.

3. An apparatus of claim 2 wherein clearances are formed to both sides of the sliding key when the sliding key is activated to move to the larger surface of the key hole with the foot brake being operated.

4. A method for controlling a parking apparatus comprising an inner rotating member fixed to an output shaft of a transmission and an outer rotating member with indents formed on an outer circumference, the outer rotating member being hydraulically rotatable at a predetermined displacement with respect to the inner rotating member, the method comprising the steps of:
    (a) determining if a select lever is in a P range;
    (b) determining if a foot brake is operating when the select lever is in P range;
    (c) supplying fluid pressure to rotate the outer rotating member with respect to the inner rotating member at the predetermined displacement when the foot brake is operating;
    (d) determining if the select lever is shifted to another range;
    (e) discontinuing the fluid pressure supply when the select lever is shift to another range;
    (f) determining if the vehicle velocity equals zero;
    (g) determining if the select lever is in the P range when the vehicle speed equals zero;
    (h) determining if the foot brake is operating when the select lever is in the P range;
    (i) determining if the engine is stopped.

5. A method of claim 3 further comprising the steps of:
    (j) determining, when the select lever is not shifted from the P range to another range in the step (d), if the foot brake is operating; and
    (k) discontinuing the fluid pressure supply when the foot brake is not operating, and returning to the step (a).

* * * * *